United States Patent [19]
Roote et al.

[11] Patent Number: 4,836,659
[45] Date of Patent: Jun. 6, 1989

[54] LENS

[75] Inventors: Robert J. Roote, High Wycombe; Ian K. Pasco, Warfield; Ian J. Smithers, Taplow, Nr. Maidenhead; Paul J. Fisher, Slough, all of England

[73] Assignee: Combined Optical Industries Limited, Slough, England

[21] Appl. No.: 149,281

[22] Filed: Jan. 28, 1988

[30] Foreign Application Priority Data

Jan. 28, 1987 [GB] United Kingdom ................. 8701879

[51] Int. Cl.$^4$ .......................... B29D 7/60; G02B 3/00
[52] U.S. Cl. ..................................... 350/409; 350/320; 350/417
[58] Field of Search ................ 350/409, 417, 436, 320

[56] References Cited

U.S. PATENT DOCUMENTS 2,473,588  6/1949  Johnson ............................. 350/417
2,906,160  9/1959  St. Palley .......................... 350/436

Primary Examiner—Bruce Y. Arnold
Assistant Examiner—Rebecca D. Gass
Attorney, Agent, or Firm—Scrivener and Clarke

[57] ABSTRACT

A convex lens has a geometric axis, defined to be an axis passing through the lens at a central point normally to the general plane of the lens, spaced from its optical axis defined to be an axis passing through the lens between its focal points. The lens may be manufactured from a mould, at least one concave surface of which has a center point spaced from a deepest point, said mould having a feed point at an edge point substantially in a plane extending from said center point through said deepest point to the edge of the concave surface. A transparent plastics material may then be injected into the mould cavity through the feed point.

2 Claims, 1 Drawing Sheet

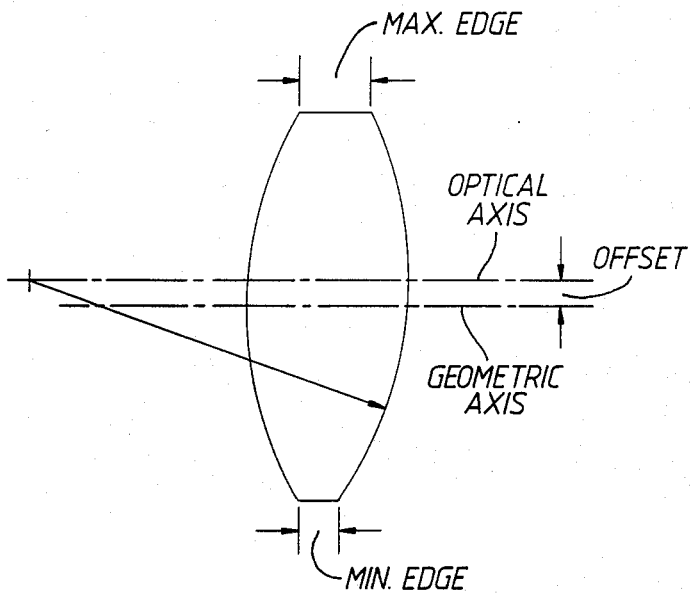
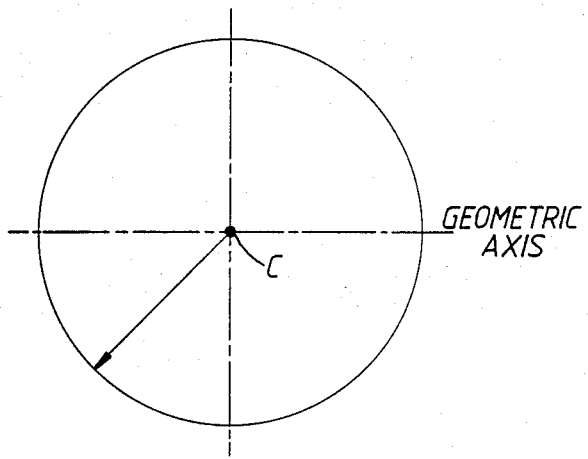

LENS

The present invention relates to lenses. More particularly, but not exclusively, it relates to lenses produced from plastics material by an injection moulding process.

It is well known to produce lenses by injection moulding, but one difficulty has always been apparent. A convex lens (which term includes bi-convex and plano-convex) is, by its nature, thicker at the centre than at its edges. In order to feed the plastics material in the injection moulding process, a feed point or gate must be provided at an edge so as not to impair the optical surfaces of the lens. The injection process feed point is of finite thickness and in fact needs to be sufficiently large to assure good lens quality. In order to accommodate the size of the feed point, it has hitherto been necessary to increase the thickness of the lens overall.

It is an object of the present invention to provide a design of lens which enables a feed point of conventional size while reducing the overall thickness of the lens. By decreasing the thickness, the lens uses less material, is lighter, which may be important for hand-held magnifying lenses, and most importantly, it allows a decrease in the manufacturing time and hence the manufacturing cost.

Looking at, or rather through, the face of a lens, it may be circular, elliptical, square, rectangular or occasionally any other shape. Whatever the shape there will be a central point. The geometric axis is defined as an axis passing through the lens at this central point normally to the general plane of the lens.

The optical axis is defined as an axis passing through the lens between its focal points.

According to a first aspect of the present invention there is provided a convex lens having a geometric axis (as herein before defined) spaced from its optical axis (as herein before defined).

Preferably the lens is of plastics material and may be manufactured by an injection moulding process.

According to the second aspect of the present invention there is provided a method of manufacturing a convex lens comprising the steps of providing a mould, at least one concave surface of which has a centre point spaced from a deepest point, said mould having a feed point at an edge point substantially in a plane extending from said centre point through said deepest point to the edge of the concave surface, and injecting into the mould cavity through the feed point a transparent plastics material.

An embodiment of the present invention will now be more particularly described by way of example and with reference to the accompanying drawing, in which:

FIG. 1 is a cross-section through a bi-convex lens; and

FIG. 2 is a front veiw of the lens.

Referring now to the drawings, there is shown a circular bi-convex lens. As can be seen from FIG. 2, the centre of the lens is marked by point C and an axis passing through this point C and projecting out of the page, or as shown in FIG. 1, is termed the geometric axis. It is conventional in lenses that this axis is also the optical axis, by which is meant the axis joining the focal points of the lens. Conventionally, these two axes are coincident and the lens is generaillly symmetrical about point C. However, in order to avoid or minimise distortion, the lens need only be symmetrical about the optical axis and it has been found that if the geometric axis is displaced from the line of the optical axis, no undue distortion results. Since the thickness of the lens is determined by the thickness of the maximum edge, which must accommodate the injection process feed point, the lens may be overall made thinner. This is shown clearly in FIG. 1. The feed point should always be on that size of the lens nearer the optical axis than the geometric axis.

Lenses embodying the invention may be made by conventional moulding techniques, with the exception that the mould surfaces are shaped to correspond with these offset lens surfaces. Since the lens is less thick, the manufacturing time is reduced and hence the manufacturing costs are reduced. The invention is, of course, not restricted to lenses manufactured by injection moulding but may be used in any lens, whether plastics or glass. The surfaces of the lens may be spherical or aspheric, in either case being symmetrical about the optical axis.

The amount of offset between the axes may be determined by the size of the maximum edge thickness required, the curvature of the lens, the overall dimensions of the lens, and the degree of thickness reduction desired. Quite small offsets between the axes can make considerable differences to the overall lens thickness.

The cross-section of lens shown in FIG. 1 is obviously somewhat exagerated in order to show clearly the difference in edge thickness. In fact, in two presently preferred examples, the minimum edge thickness is 1.574 mm and the maximum edge thickness is 4.655 mm, in each case for a lens of overall diameter 84 mm. In one lens the offset distance is 1.9445 mm, in another 2.56 mm. In the former case, figures for edge thickness at various points on the circumference (as defined by the angular position relative to the minimum thickness point at 0°) are given in the Table below.

| ANGLE | THICKNESS (mm) | ANGLE | THICKNESS (mm) |
| --- | --- | --- | --- |
| 0 | 1.574 | 95 | 3.242 |
| 5 | 1.580 | 100 | 3.376 |
| 10 | 1.597 | 105 | 3.507 |
| 15 | 1.626 | 110 | 3.636 |
| 20 | 1.666 | 115 | 3.760 |
| 25 | 1.717 | 120 | 3.880 |
| 30 | 1.779 | 125 | 3.994 |
| 35 | 1.850 | 130 | 4.101 |
| 40 | 1.932 | 135 | 4.201 |
| 45 | 2.022 | 140 | 4.292 |
| 50 | 2.120 | 145 | 4.374 |
| 55 | 2.226 | 150 | 4.447 |
| 60 | 2.339 | 155 | 4.510 |
| 65 | 2.458 | 160 | 4.561 |
| 70 | 2.582 | 165 | 4.602 |
| 75 | 2.710 | 170 | 4.632 |
| 80 | 2.841 | 175 | 4.649 |
| 85 | 2.974 | 180 | 4.655 |
| 90 | 3.108 | | |

What we claim is:

1. A lens comprising a body of transparent injection molded plastics material defining a convex lens having a geometric axis (an axis passing through the lens at a central point normal to the general plane of the lens), an optical axis (an axis passing through the lens between its focal points) spaced from said geometric axis, and a circumferential edge having an axial thickness and including an injection molding feed point which during molding aligns with the feed point of a mold, said feed point of said lens being nearer to the optical axis than to the geometric axis and lying on a plane passing through said two axes, the axial thickness of said edge at a point diametrically opposite said feed point being less than the axial thickness of said edge at said feed point.

2. A method of manufacturing a convex lens comprising the steps of contructing a mold cavity with at least one concave surface having a center point spaced from a deepest point, locating a feed point at an edge of said mold cavity nearer said deepest point than said center point and lying in a plane through said center and deepest points, and injecting into said mold cavity through said feed point molten transparent plastics material.

* * * * *